(12) United States Patent
Madden

(10) Patent No.: US 10,647,500 B1
(45) Date of Patent: May 12, 2020

(54) PET SANITATION BAG AND ACCESSORY CADDY

(71) Applicant: Anthony Madden, Chardon, OH (US)

(72) Inventor: Anthony Madden, Chardon, OH (US)

( * ) Notice: Subject to any disclaimer, the term of this patent is extended or adjusted under 35 U.S.C. 154(b) by 0 days.

(21) Appl. No.: 16/271,589

(22) Filed: Feb. 8, 2019

(51) Int. Cl.
*B65D 83/08* (2006.01)

(52) U.S. Cl.
CPC .................. *B65D 83/0805* (2013.01)

(58) Field of Classification Search
CPC .... A47F 13/085; B65D 83/08; B65D 83/0805
USPC .......................................... 221/34
See application file for complete search history.

(56) References Cited

U.S. PATENT DOCUMENTS

| | | | | |
|---|---|---|---|---|
| 5,042,687 | A * | 8/1991 | McKinley | A47F 1/08 221/155 |
| 5,386,910 | A * | 2/1995 | Liss | A47G 29/00 206/554 |
| 5,511,691 | A * | 4/1996 | West, Jr. | A47F 1/08 221/311 |
| 6,076,717 | A * | 6/2000 | Edwards | A01K 27/004 225/106 |
| 6,170,692 | B1 | 1/2001 | Johnston | |
| D521,781 | S | 5/2006 | Edwards | |
| 8,113,481 | B1 | 2/2012 | Krysak | |
| 8,544,413 | B1 | 10/2013 | Gnanendran | |
| 8,720,384 | B2 | 5/2014 | Gee | |
| D718,553 | S | 12/2014 | Gnanendran | |
| D718,953 | S | 12/2014 | Masino | |
| 9,010,279 | B1 | 4/2015 | Saber et al. | |
| D779,227 | S | 2/2017 | Abbott | |
| D802,959 | S | 11/2017 | Wong | |
| 9,975,660 | B2 | 5/2018 | Cartledge et al. | |
| 10,058,074 | B1 * | 8/2018 | Bussell | A01K 23/005 |
| 2002/0139811 | A1 * | 10/2002 | Tramontina | A47K 10/424 221/197 |
| 2003/0010788 | A1 * | 1/2003 | Chen | A47F 13/085 221/26 |
| 2005/0178736 | A1 * | 8/2005 | Wilfong, Jr. | A47F 13/085 211/59.1 |
| 2007/0045333 | A1 * | 3/2007 | Mitchell | A47K 10/424 221/34 |
| 2008/0264965 | A1 * | 10/2008 | Reinsel | A47K 10/426 221/44 |
| 2009/0114670 | A1 * | 5/2009 | Bellafatto | A47F 13/085 221/92 |
| 2009/0151645 | A1 | 6/2009 | Fangsrud | |

(Continued)

*Primary Examiner* — Gene O Crawford
*Assistant Examiner* — Ayodeji T Ojofeitimi
(74) *Attorney, Agent, or Firm* — Goldstein Law Offices, P.C.

(57) ABSTRACT

A pet sanitation bag and accessory caddy for storing a plurality of pet sanitation bags and one or more pet care accessories, comprising a housing having an interior cavity and an upper and a lower dispensing aperture. The interior cavity is adapted to store the sanitation bags, while the upper and lower dispensing apertures provide access to the entire interior cavity and the sanitation bags stored therein. The housing further has a pet accessory hook adapted to allow the pet care accessory to be detachably secured, allowing a user to retrieve both the sanitation bags and the pet care accessory prior to conducting a pet related activity. The housing is further adapted to be secured to a vertical mounting surface.

4 Claims, 4 Drawing Sheets

(56) References Cited

U.S. PATENT DOCUMENTS

| | | | |
|---|---|---|---|
| 2009/0178942 A1* | 7/2009 | Balazs | A63B 57/203 206/315.1 |
| 2009/0223991 A1* | 9/2009 | Lorenzati | A47K 10/421 221/34 |
| 2009/0223993 A1* | 9/2009 | Lorenzati | A47K 10/42 221/35 |
| 2012/0279981 A1* | 11/2012 | Thomas | B65D 83/0805 221/1 |
| 2013/0284756 A1* | 10/2013 | Springer | B65D 83/08 221/34 |

* cited by examiner

PET SANITATION BAG AND ACCESSORY CADDY

TECHNICAL FIELD

The present disclosure relates generally to a caddy for holding pet care articles. More particularly, the present disclosure relates to a caddy for detachably securing pet accessories and storing and dispensing pet sanitation bags.

BACKGROUND

Caring for a pet often requires a pet owner to have a variety of different pet care articles readily at hand, and gathering all the necessary pet care articles before conducting a pet related activity can be time consuming. For example, disposable pet sanitation bags are an essential pet care article and are commonly used to pick up and contain pet waste for later disposal. Such bags may be used in both indoor and outdoor settings for cleaning waste left in litterboxes or collecting waste on the ground while walking one's dog. Furthermore, outdoor activities may require that the pet owner place a leash or a jacket on the pet.

Although examples of devices for holding pet care accessories or storing and dispensing pet sanitation bags may be found within the prior art, these devices do not provide a single solution for storing both the sanitation bags and the necessary pet care accessories, thus requiring the pet owner to retrieve these articles separately prior to conducting a pet related activity. In contrast a device that would store both pet sanitation bags and a leash next to a door allows the pet owner to leash the pet and retrieve the bags prior to exiting the building to conduct outdoor activities. Similarly, storing both pet sanitation bags along with a scooper near a litterbox ensures that both essential pet care articles are readily at hand, thus simplifying the task of cleaning the litterbox. Another deficiency of devices within the prior art concerns a flaw inherent in existing containers for dispensing pet sanitation bags. Existing containers for pet sanitation bags have a single opening, making it difficult to reach any remaining bags stored within when the supply of bags within the container is close to depletion, especially when the container is large. Reducing the size of the container would shrink the number of sanitation bags contained and require frequent replenishment. A need therefore exists for a caddy which stores and provides efficient access to a large quantity of pet sanitation bags, which further stores additional pet care accessories and can be positioned at a location most convenient to pet owners.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a single caddy which is adapted to store pet sanitation bags and pet care accessories for later use. Accordingly, the present disclosure provides a pet sanitation bag and accessory caddy comprising a housing having an interior cavity adapted to store a plurality of pet sanitation bags, and an upper and a lower dispensing aperture through which the sanitation bags are dispensed, the caddy further having a pet accessory hook adapted to detachably secure one or more pet care accessories which are necessary for a pet owner to perform a pet-related activity.

It is another aspect of an example embodiment in the present disclosure to provide a caddy which is can be secured to a wall, door, or other surface. Accordingly, the present disclosure provides a housing which is adapted to be secured to a vertical mounting surface via a vertical mounting means, and the housing may further have a flat mounting strip adapted to engage with the vertical mounting surface.

It is yet another aspect of an example embodiment in the present disclosure to provide a caddy which allows the pet sanitation bags to be easily inserted. Accordingly, the present disclosure provides a housing with an upper opening which allows the pet sanitation bags to be downwardly inserted into the interior cavity.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, diagrammatical which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
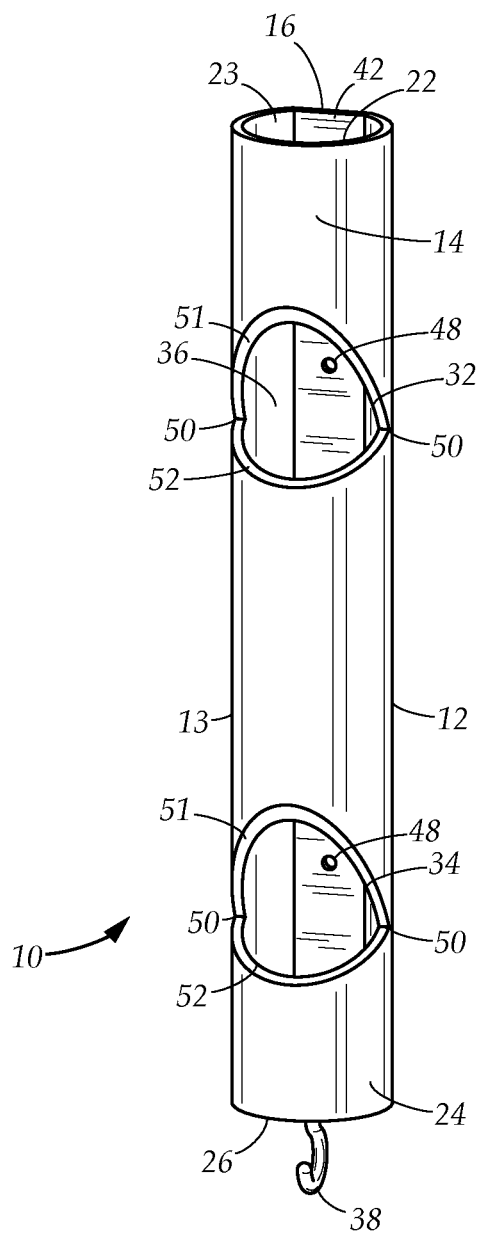
FIG. 1 is a diagrammatical perspective view of a pet sanitation bag and accessory caddy comprising an elongated housing having an interior cavity, and upper end, a lower end, an upper dispensing aperture, and a lower dispensing aperture, in accordance with an embodiment of the present disclosure.
Figure 3:
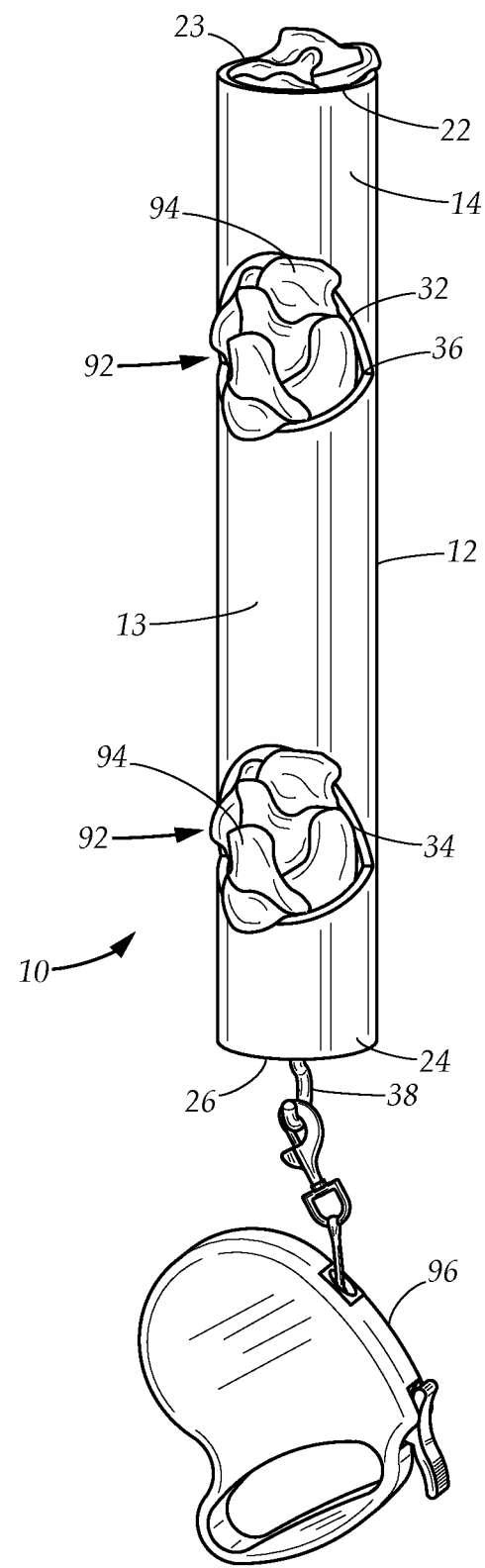
FIG. 3 is a diagrammatical perspective view of the pet sanitation bag and accessory caddy depicting a plurality of sanitation bags stored within the interior cavity of the caddy which are accessible via the upper and lower dispensing apertures, further showing a pet care accessory removably attached to the caddy via an accessory hook positioned at the lower end of the housing, in accordance with an embodiment of the present disclosure.
Figure 4:
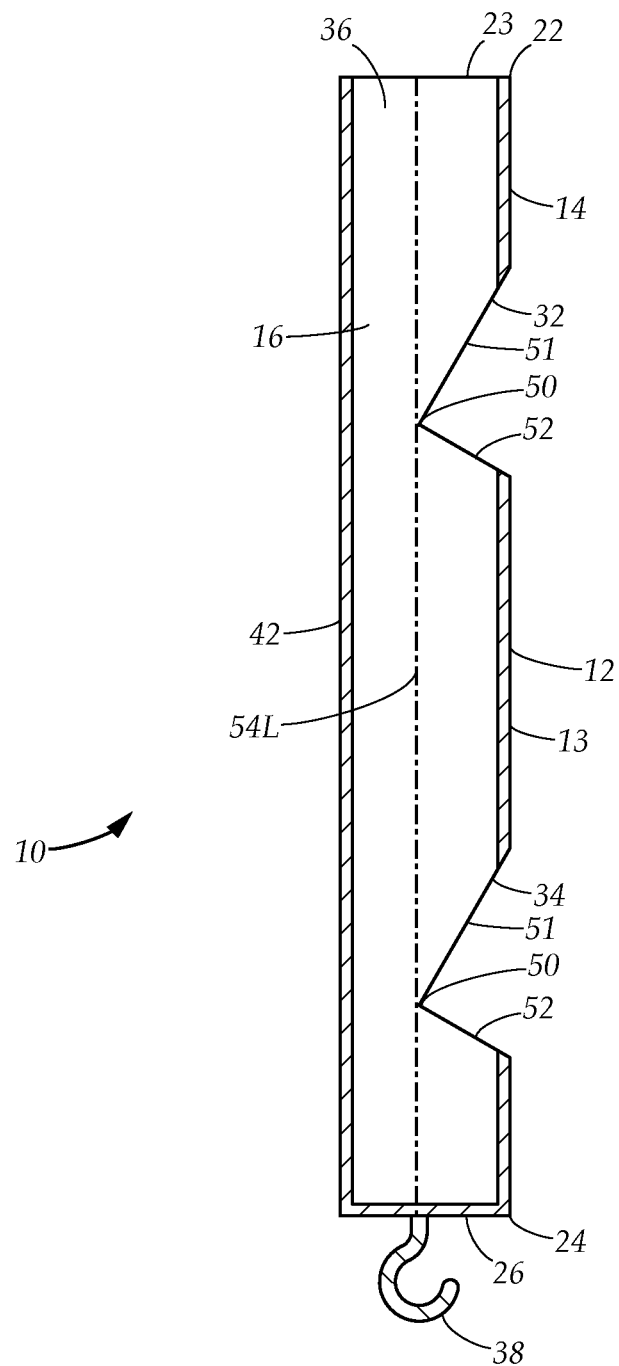
FIG. 4 is a diagrammatical cross section view of the pet sanitation bag and accessory caddy depicting the interior cavity, further showing an upper opening disposed at the upper end of the housing along with the size of the upper and lower dispensing apertures in relation to the front and rear portions, in accordance with an embodiment of the present disclosure.

FIG. 1 illustrates a pet sanitation bag and accessory caddy 10 comprising a housing 12 having an upper end 22, a lower end 24 oriented distally thereto, and a housing body 13 which extends between the upper end 22 and the lower end 24. The housing 12 is substantially hollow, and has an interior cavity 36 which is defined by the housing body 13 and the upper and lower ends 22, 24. Referring to FIGS. 3 and 4 while continuing to refer to FIG. 1, the interior cavity 36 is adapted to receive and retain a plurality of pet sanitation bags 94 commonly used by pet owners to store and dispose of pet waste. The bags 94 may be formed from plastic, paper, or other material, and are compressible when aggregated, and may form a mass 92 when the individual bags 94 are compressed together within the interior cavity 36.

In a preferred embodiment, the housing body 13 is elongated and is shaped like a tube extending between the upper and lower ends 22, 24. The housing body 13 is further divided longitudinally between a front portion 14 and a rear portion 16. The housing 12 further has an upper dispensing aperture 32 positioned on the front portion 14 proximate to the upper end 22, and a lower dispensing aperture 34 positioned on the front portion 14 between the upper dispensing aperture 32 and the lower end 24, through which the bags 94 are dispensed. The upper and lower dispensing apertures 32, 34 open forwardly away from the rear portion 16, and allow a user to access the bags 94 stored within the interior cavity 36 and withdraw the bags 94 for use. The upper and lower dispensing apertures 32, 34 are sized to allow the user's fingers to pass therethrough. For example, the upper and lower dispensing apertures 32, 34 may each have a width of approximately three inches. Furthermore, the upper and lower dispensing apertures 32, 34 are arranged between the upper and lower ends 22, 24 such that the user may access the entirety of the interior cavity 36 via either the upper or the lower dispensing apertures 32, 34. When one of the pet sanitation bags 94 is located in a portion of the interior cavity 36 which is inaccessible from one of the upper or lower dispensing apertures 32, 34, the user may remove the pet sanitation bag 94 through the other dispensing aperture. Note that in alternate embodiments, the housing body 13 may be in the shape of a polygonal prism instead of a tube.

The housing 12 may be any size sufficient to store a significant quantity of the pet sanitation bags. In an example embodiment, the housing body 13 may be approximately twenty inches in length between the upper and lower ends 22, 24 with a diameter of approximately three inches. The upper dispensing aperture 32 may be positioned at approximately four inches from the upper end 22 and have a height of four inches, while the lower dispensing aperture may be positioned at approximately four inches from the from the lower end 24 and have a height of approximately four inches.

In a preferred embodiment, the housing 12 further has an upper opening 23 positioned at the upper end 22 which allows the pet sanitation bags 94 to be inserted downwardly into the interior cavity 36. The user may continue to insert additional bags 94 until the interior cavity 36 is filled from the lower end 24 to the upper end 22. The compressed mass 92 formed by the bags 94 may expand within the interior cavity 36, causing one or more of the bags 94 to protrude outwardly through the upper or the lower dispensing apertures 32, 34, allowing the user to remove the bags 94 without reaching into the interior cavity 36.

The lower end 24 of the housing 12 is sealed via a closed portion 26 to prevent the bags 94 within the interior cavity 36 from falling downwardly through the lower end 24. Furthermore, the pet sanitation bag and accessory caddy 10 also comprises an accessory hook 38 which is attached to the closed portion 26 of the lower end 24 and is adapted to detachably secure one or more pet care accessories 96. The pet care accessories 96 may include leashes, harnesses, toys, travel bags, pet footwear, pet jackets, scoops for removing pet waste from litterboxes, and other accessories commonly used by pet owners for the care, well-being, or amusement of their pets. By storing the pet sanitation bags 94 and the pet care accessories 96 at a single location within a unitary device, the pet sanitation bag and accessory caddy 10 allows the user to quickly withdraw one or more of the sanitation bags 94 and the appropriate pet care accessories 96 prior to conducting a pet-related activity. For example, the caddy 10 may be secured to a wall next to a litterbox or door for the convenience of the user.

Figure 2:
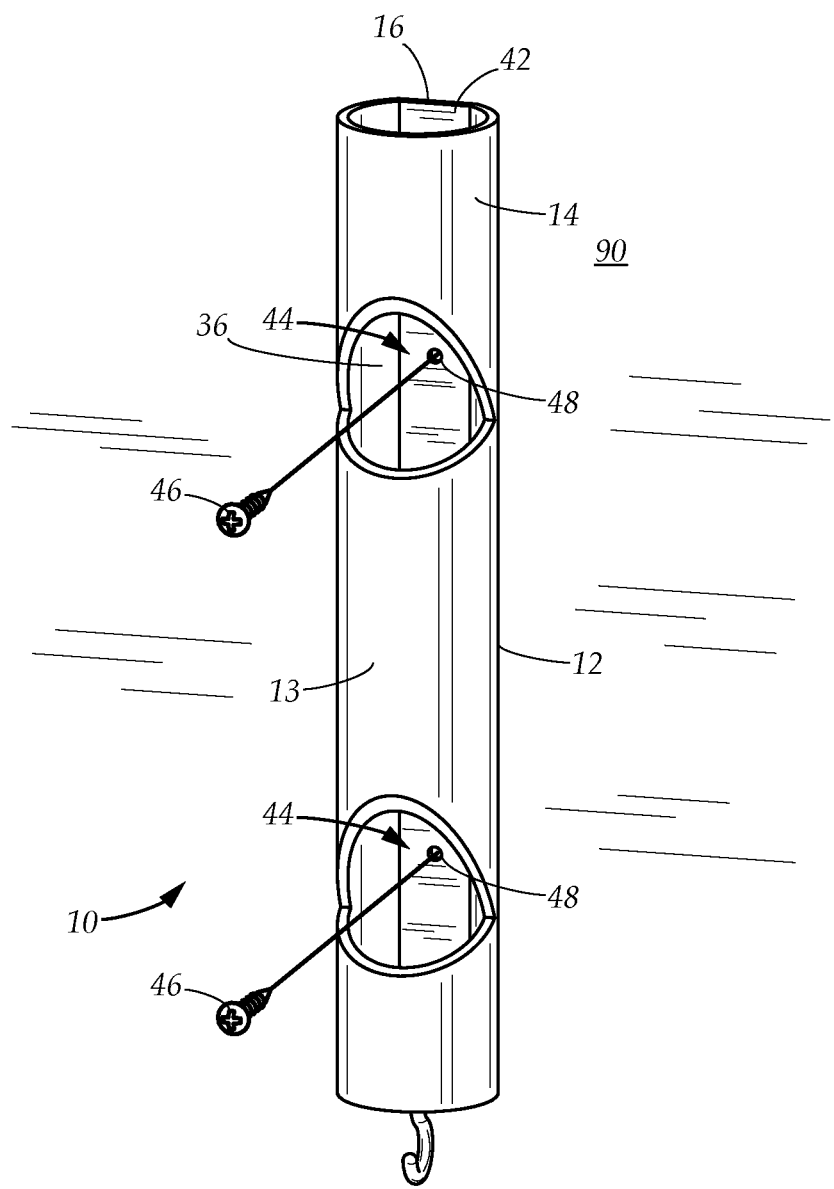
FIG. 2 is a diagrammatical perspective view of the pet sanitation bag and accessory caddy, showing the caddy being mounted to a vertical planar surface such as a wall, in accordance with an embodiment of the present disclosure.

Turning to FIG. 2, the pet sanitation bag and accessory caddy 10 is adapted to be secured to a vertical mounting surface 90, such as a wall, door, a post, or other vertically oriented surface, via one or more vertical mounting means 44 positioned at the rear portion 16 of the housing 12. In a preferred embodiment, the vertical mounting means may comprise screws 46 which pass through screw holes 48 disposed on the rear portion 16 of the housing 12 to secure the housing 12 to the vertical mounting surface 90. The screw holes 48 are positioned opposite from, and are accessible through the upper and lower dispensing apertures 32, 34. In alternate embodiments, the vertical mounting means 44 may comprise nails, adhesives, clips, or any other commonly used method for securing furniture, shelving, or decorations to walls. In one embodiment, the rear portion 16 of the housing 12 may have a flat mounting strip 42 extending along the rear portion 16 between the upper and lower ends 22, 24. The flat mounting strip 42 is adapted to engage with the vertical mounting surface 90 while the pet sanitation bag and accessory caddy 10 is secured in place via the vertical mounting means 44.

Referring now to FIG. 4 while also referring to FIGS. 1 and 3, the front portion 14 and the rear portion 16 of the housing 12 may be demarcated by a vertical dividing plane 54L which passes through the housing 12 from the upper end 22 to the lower end 24. In certain embodiments, the front portion 14 and the rear portion 16 each have a circumference, with the circumference of the front portion 14 being equal to or greater than the circumference of the rear portion 16. The upper and lower dispensing apertures 32, 34 may each be defined by an upper arc 51 which extends upwardly along the front portion 14, and a lower arc 52 which extends downwardly along the front portion 14. The upper and lower arcs 51, 52 of the upper and lower dispensing apertures 32, 34 each have a pair of shared endpoints 50 which intersect the vertical dividing plane 54L, and the upper and lower arcs 51, 52 begin and end between the pair of endpoints 50. The upper and lower dispensing apertures 32, 34 extend towards the rear portion 16 as well as the upper and lower ends 22, 24 of the housing 12, allowing the user to access the interior cavity 36 and the bags 94 stored therein from any angle along the circumference of the front portion 14.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a pet sanitation bag and accessory caddy. The disclosure is illustrated by example in the drawing figures, and throughout the written description. It should be understood that numerous variations are possible, while adhering to the inventive concept. Such variations are contemplated as being a part of the present disclosure.

What is claimed is:

1. A pet sanitation bag and accessory caddy for use with a plurality of pet sanitation bags and one or more pet care accessories, the caddy further adapted to be secured to a vertical mounting surface, the caddy comprising:

a housing having an upper end, a lower end oriented distally thereto, and a tube shaped housing body extending between the upper and lower ends, the housing body having a front portion, a rear portion, and an upper opening at the upper end, the housing is substantially hollow and further has an interior cavity defined by the housing body and the upper and lower ends, the interior cavity is adapted to store the plurality of pet sanitation bags, the upper opening is adapted to allow the pet sanitation bags to be inserted downwardly into the interior cavity, the housing is adapted to be secured to the vertical mounting surface via one or more vertical mounting means;

an upper dispensing aperture positioned on the housing body towards the upper end, and a lower dispensing aperture positioned between the upper dispensing aperture and the lower end, the upper and lower dispensing apertures are positioned on the front portion of the housing body and are adapted to allow a user to access the interior cavity to remove one of the plurality of bags stored therein;

an accessory hook positioned at the lower end of the housing which is adapted to allow the pet care accessories to be detachably secured thereon; and wherein the front portion and the rear portion are demarcated by a vertical dividing plane which passes through the housing from the upper end to the lower end, the front portion and the rear portion each have a circumference, and the circumference of the front portion is equal to or greater than the circumference of the rear portion.

2. The pet sanitation bag and accessory caddy described in claim 1, wherein:

the upper and lower dispensing apertures are each defined by an upper arc which extends upwardly along the front portion and a lower arc which extends downwardly along the front portion, the upper and the lower dispensing apertures each have a pair of shared endpoints which intersect the vertical dividing plane such that the upper arc and the lower arc of the upper and the lower dispensing apertures begin and end between their respective endpoints, whereby the upper and the lower dispensing apertures extend rearwardly towards the rear portion and are adapted to allow the user to access the interior cavity and the pet sanitation bags stored therein from any angle along the circumference of the front portion.

3. The pet sanitation bag and accessory caddy described in claim 2, wherein:

the rear portion of the housing has a flat mounting strip extending between the upper end and the lower end, and is adapted to engage with the vertical mounting surface.

4. The pet sanitation bag and accessory caddy described in claim 3, wherein:

the vertical mounting means comprise a plurality of screws and screw holes which pass through the flat mounting strip and are adapted to secure the housing to the vertical mounting surface.

* * * * *